(12) United States Patent
Mulholland et al.

(10) Patent No.: US 11,269,527 B2
(45) Date of Patent: Mar. 8, 2022

(54) REMOTE DATA STORAGE (71) Applicant: INTERNATIONAL BUSINESS MACHINES CORPORATION, Armonk, NY (US)

(72) Inventors: Miles Mulholland, Hampshire (GB); Alex Dicks, Winchester (GB); Dominic Tomkins, Hampshire (GB); Eric John Bartlett, Bowerchalke (GB)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 16/535,259

(22) Filed: Aug. 8, 2019

(65) Prior Publication Data

US 2021/0042049 A1   Feb. 11, 2021

(51) Int. Cl.
*G06F 3/06* (2006.01)
*G06F 11/30* (2006.01)
*G06F 11/34* (2006.01)

(52) U.S. Cl.
CPC ............ *G06F 3/0638* (2013.01); *G06F 3/067* (2013.01); *G06F 3/0611* (2013.01); *G06F 3/0653* (2013.01); *G06F 11/3034* (2013.01); *G06F 11/3466* (2013.01)

(58) Field of Classification Search
None
See application file for complete search history.

(56) References Cited

U.S. PATENT DOCUMENTS

| 8,874,863 | B2 | 10/2014 | Mutalik et al. |
| 9,864,620 | B2* | 1/2018 | Barabash ............... H04L 47/10 |
| 9,996,291 | B1* | 6/2018 | Izhar .................. G06F 13/4022 |
| 2004/0054997 | A1* | 3/2004 | Katragadda ........... G06F 9/5044 |
| | | | 718/102 |
| 2006/0206675 | A1* | 9/2006 | Sato ..................... G06F 3/0647 |
| | | | 711/161 |
| 2006/0277384 | A1 | 12/2006 | Yagawa et al. |
| 2011/0099265 | A1* | 4/2011 | Antani .................. G06F 9/5016 |
| | | | 709/224 |
| 2013/0297907 | A1* | 11/2013 | Ki ....................... G06F 12/0684 |
| | | | 711/170 |
| 2014/0059009 | A1 | 2/2014 | Blea et al. |

(Continued)

FOREIGN PATENT DOCUMENTS

WO         2016098138 A1    6/2016

*Primary Examiner* — Tracy C Chan
(74) *Attorney, Agent, or Firm* — Steven M. Bouknight (57) ABSTRACT

Concepts for remote storage of data are presented. Once such concept is a system comprising: a primary storage controller; and a secondary storage controller of a remote data storage system. The primary storage controller is configured to determine a service characteristic of data storage to or data retrieval from the remote data storage system and to communicate service performance signals to the secondary storage controller based on the determined service characteristic. The secondary storage controller is configured to receive service performance signals from the primary storage controller, to compare the received service performance signals with a service requirement so as to determine a service comparison result, and to control data storage to or data retrieval from the remote data storage system based on the service comparison result.

16 Claims, 5 Drawing Sheets

(56) References Cited

U.S. PATENT DOCUMENTS

| | | | |
|---|---|---|---|
| 2014/0075111 A1* | 3/2014 | Pike | G06F 3/061 |
| | | | 711/114 |
| 2014/0236891 A1* | 8/2014 | Talius | G06F 11/00 |
| | | | 707/613 |
| 2016/0320980 A1* | 11/2016 | Fang | G06F 3/0631 |
| 2016/0357644 A1 | 12/2016 | Gordon et al. | |
| 2017/0344284 A1* | 11/2017 | Choi | G06F 3/0653 |
| 2018/0032254 A1 | 2/2018 | Okada et al. | |

* cited by examiner

REMOTE DATA STORAGE

BACKGROUND

The present invention relates generally to the field of data storage, and more particularly to a system and method for the remote storage of data. The present invention also relates to a method for the remote storage of data.

The present invention also relates to a computer program product comprising computer-readable program code that enables a processor of a system, or a number of processors of a network, to implement such a method.

In the field of data storage, 'thin provisioning' is a widely known concept where a storage system does not wholly allocate its advertised capacity. Instead, storage is only allocated when the storage must be used.

Both block systems and file systems implement equivalents of this: file systems are effectively thin provisioned by their nature (since files can only be allocated upon creation), and block systems can have thin provisioning implemented using a forward lookup structure to map allocated ranges to the physical storage medium.

Thin provisioning allows the implementation of advanced space saving techniques, such as compression and deduplication, because only the forward lookup structure need be updated with appropriate details (e.g., whether the forward lookup structure is compressed, or pointing the forward lookup structure for a virtual address to another forward lookup structure entry containing the data in question).

The decoupling of incoming "virtual" addresses (i.e., addresses relevant for forward lookup) and the underlying storage means that two adjacent Input/Output (10) systems can be assigned to two completely different backend (e.g., remote) data storage systems, with completely different IO characteristics.

Copy services are a collection of features which allow storage systems to have, amongst other things, disaster recovery integrated into the IO path. This is achieved via Remote Copy features, by transmitting data to a remote data storage system. However, use of a remote data storage system may experience problems if the remote data storage system and/or the communication link exhibits delays and/or poor performance. This may, in turn, directly impact the primary site which is relying on the remote data storage system. For example, if a sync-buffer fills up due to performance issues, data storage or retrieval to/from the remote data storage system may exhibit delays and/or errors.

SUMMARY

According to another aspect of the invention, there is provided a system for remote storage of data. The system comprises a primary storage controller and a secondary storage controller of a remote data storage system. The primary storage controller comprises: a service monitoring component configured to determine a service characteristic of data storage or retrieval to/from the remote data storage system; and a communication interface configured to communicate service performance signals to the secondary storage controller based on the determined service characteristic. The secondary storage controller comprises: an input interface adapted to receive service performance signals from the primary storage controller; a service analysis component configured to compare the received service performance signals with a service requirement so as to determine a service comparison result; and a control component adapted to control data storage or retrieval to/from the remote data storage system based on the service comparison result.

According to another aspect of the invention, there is provided a computer-implemented method for remote storage of data. The method comprises determining, at a primary storage controller, a service characteristic of data storage or retrieval to/from the remote data storage system. The method also comprises communicating service performance signals from the primary storage controller to a secondary storage controller of a remote data storage system based on the determined service characteristic. The method further comprises receiving service performance signals at the secondary storage controller. The method yet further comprises comparing, at the secondary storage controller, the received service performance signals with a service requirement so as to determine a service comparison result. The method also comprises controlling, at the secondary storage controller, data storage or retrieval to/from the remote data storage system based on the service comparison result.

The present invention further seeks to provide a computer program product including computer program code for implementing a proposed method when executed by a processing unit. The present invention also seeks to provide a processing system adapted to execute this computer program code.

According to another aspect of the invention, there is provided a computer system comprising at least one processor and the computer program product according to an embodiment. The at least one processor is adapted to execute the computer program code of said computer program product.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e., may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts for ensuring that service requirements for remote storage of data are met. Embodiments may therefore help to ensure that that remote copy partnerships remain consistent and are not subject to slandering (e.g., due to remote storage system latencies). This may be achieved by implementing and monitoring service agreements (e.g., agreed service requirements) between primary and second storage controllers. Based on how detected or monitored service characteristic compares with a pre-agreed service agreement (e.g., target or minimum service characteristic), data storage or retrieval to/from the remote data storage system may be controlled so as to ensure the pre-agreed service agreement is adhered to. This may, for example, comprise selecting optimal garbage collection workloads and/or storage tier destinations for copy-targets.

Such concepts may employ an approach of assessing service performance against a service requirement, and then controlling (e.g., adapting, modifying, altering, etc.) data storage or retrieval to/from the remote data storage system based on the result of the assessment.

For example, in situations where a production site is indicating that remote copy partnerships are in danger of exhausting Remote Copy (RC) resources (e.g., via the increased occurrence or detection of errors), or breaching a notion such as Recovery Point Objective (RPO), a secondary storage controller associated with the remote data storage system may preferentially allocate higher performing storage for incoming writes to that volume. Assuming this behavior to be a burst, other optimizations can be made on the remote data storage system, such as temporarily relaxing garbage collection on the pool to allow for more system bandwidth (at the cost of having a lower reclamation rate).

According to proposed concepts, one or more service agreements between the production sites and remote data storage system may be defined, and embodiments may be configured to control data storage and/or retrieval so that the one or more service agreements are met. For instance, an aspect of system performance may be represented via a service characteristic, and embodiments may be configured to monitor the service characteristic against a predetermined target value for the service characteristic. Based on a comparison between detected values for the service characteristic and the predetermined target value for the service characteristic, data storage or retrieval to/from the remote data storage system may be controlled (e.g., so as to ensure the predetermined target value for the service characteristic is met or exceeded).

Proposed embodiments may thus provide a method and/or system for controlling remote storage of data to ensure that a service characteristic meets a predetermined service requirement or target. Accordingly, remote storage of data may be implemented in an optimized and flexible manner.

Embodiments may therefore provide a tool for managing and/or controlling the performance of a remote data storage, thus enabling optimal operation of a remote data storage system for example.

By way of example, a proposed embodiment provides a system for remote storage of data, wherein the system comprises: a primary storage controller; and a secondary storage controller of a remote data storage system. The primary storage controller comprises: a service monitoring component configured to determine a service characteristic of data storage or retrieval to/from the remote data storage system; and a communication interface configured to communicate service performance signals to the secondary storage controller based on the determined service characteristic. The secondary storage controller comprises: an input interface adapted to receive service performance signals from the primary storage controller; a service analysis component configured to compare the received service performance signals with a service requirement so as to determine a service comparison result; and a control component adapted to control data storage or retrieval to/from the remote data storage system based on the service comparison result.

By way of example, the service requirement may comprise at least one of: a maximum latency; a minimum available buffer space; a minimum available data storage space; and a maximum recovery point objective. Embodiments may therefore be used to ensure that various different performance aspects or criteria are adhered to. Further, by employing a plurality of different requirements, embodiments may be configured to cater multiple performance criteria, rather than simply focusing on a single aspect at the detriment of another performance aspect for example.

The service monitoring component may be configured to determine at least one of: a latency of a communication link between the primary storage controller and the secondary storage controller; a data write latency of the remote data storage system; a status of a recovery point objective; an available data storage space of the remote data storage system; and an available buffer space of the remote data storage system. In this way, different performance characteristics may be monitored and employed to adapt the control of data storage and/or retrieval. Such characteristics may be simple and/or cheap to determine, thus facilitating straight-forward and/or cost-effective implementation.

Embodiments may further comprise a service definition component configured to determine the service requirement. Thus, although in some embodiments, the service requirement may have already been established (e.g., via a previously undertaken process), some embodiments may further comprise the step of determine the service requirement. Accordingly, some embodiments may be configured to facilitate both a service requirement determination process and a process of controlling data storage/retrieval based on adhering to such a service requirement.

For example, the service definition component may be configured to determine the service requirement based on an input signal from a user or a control system. In this way, user preference(s) may be catered for by embodiments.

The control component of the secondary storage controller may be configured to determine a garbage collection workload based on the based on the service comparison result. In this way, optimal garbage collection workloads may be determined in order to adhere to the service requirement.

The remote data storage system may be configured to implement a plurality of storage tiers, and wherein the secondary storage controller is configured to determine a target storage tier based on the service comparison result. Embodiments may thus be employed in conjunction with thin-provisioned storage systems and used to determine optimal storage tier destinations in order to adhere to a service requirement. Accordingly, by way of further example, the secondary storage controller may be configured to control data storage or retrieval to/from a thin-provisioned file system of the remote data storage system.

In a further example, the system may also comprise: a second primary storage controller comprising: a second service monitoring component configured to determine a second service characteristic of data storage or retrieval to/from the remote data storage system; and a second communication interface configured to communicate second service performance signals to the secondary storage controller based on the determined second service characteristic. The input interface of the secondary storage controller may then be further configured to receive second service performance signals from the second primary storage controller. Further, the service analysis component of the secondary storage controller may be further configured to compare the second service performance signals with the service requirement so as to determine a second service comparison result. The control component of the secondary storage controller may then be configured to control data storage or retrieval to/from the remote data storage system further based on the second service comparison result.

It will therefore be appreciated that proposed embodiments may be configured to cater for use with a plurality of primary storage controllers.

For instance, an embodiment may be configured for two primary sites, each with a backup on a single secondary site. Each primary storage controller may derive a set of service level agreements (SLAs) (i.e., service requirements) for its backup. Each primary storage controller may also monitor performance (i.e., service characteristics) and communicate to the secondary storage controller the SLAs and performance. The secondary storage controller may then use the metrics to work out whether any of the SLAs could be in danger of not being met. The secondary storage controller may then implement or prioritize configuration changes based upon the judgement of the secondary storage controller regarding the state of the SLAs that the secondary storage controller is managing. In this way, the secondary storage controller may be able to cater for service requirements from multiple primary sites.

Figure 1:
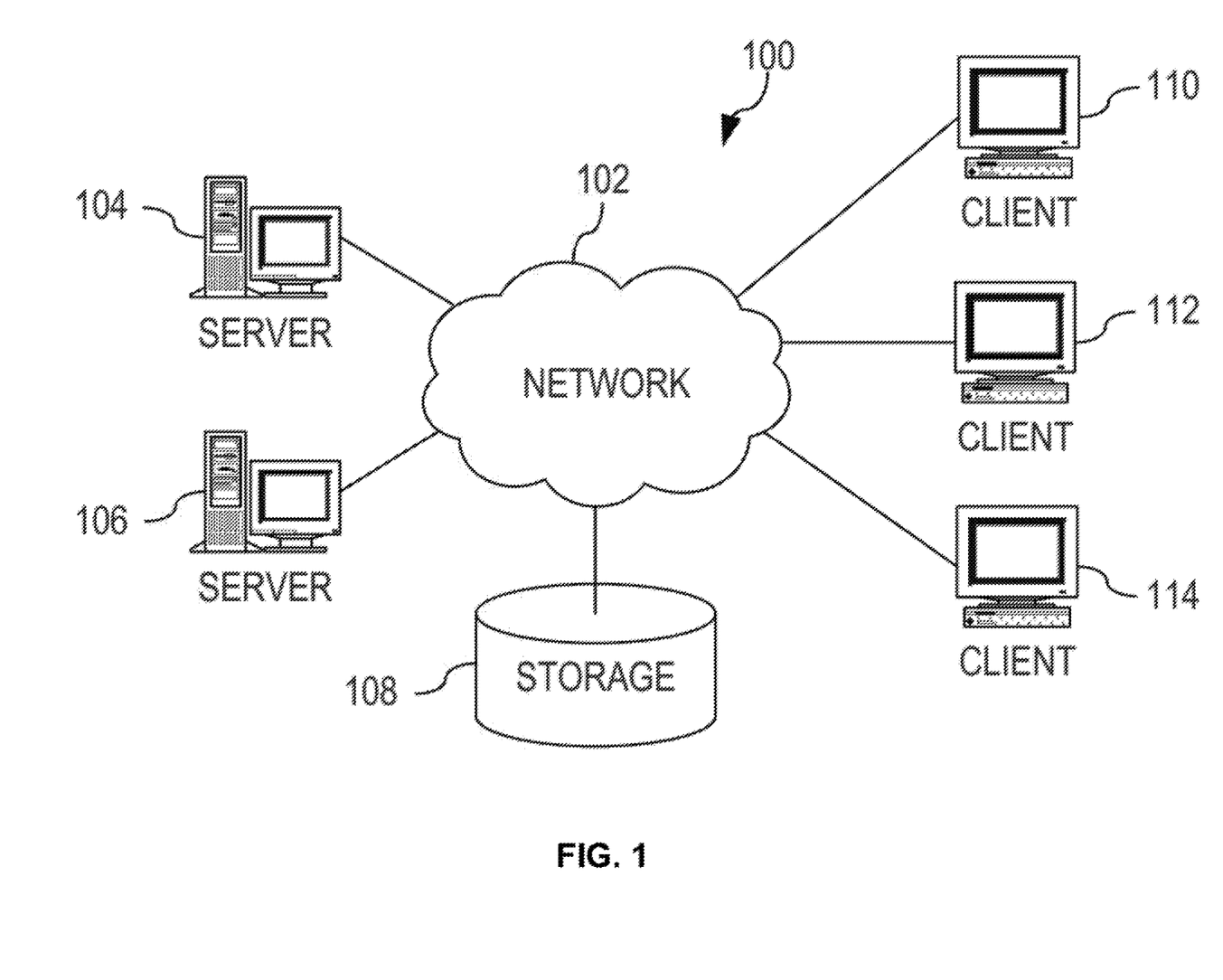
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. A distributed system 100 may include a network of computers in which aspects of the illustrative embodiments may be implemented. For instance, one computer may be at a primary site and be configured to implement a primary storage controller according to an embodiment, and another computer may be at a secondary (remote) site and implement a secondary storage controller according to an embodiment. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
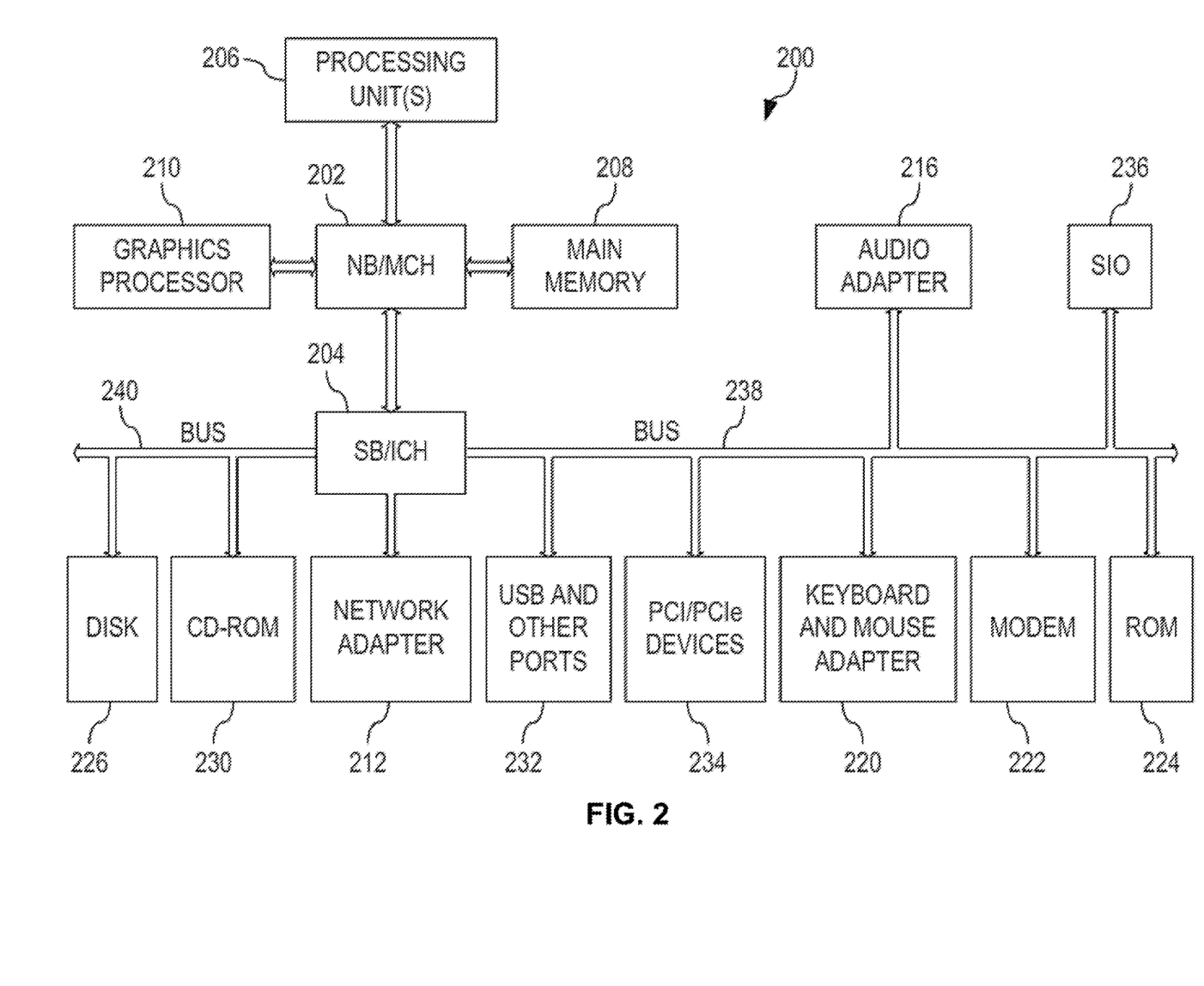
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement a secondary storage controller according to a proposed embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for controlling data storage or retrieval to/from a remote data storage system. Such embodiments may employ comparing a characteristic of data storage or retrieval to/from the remote data storage system with a service requirement. Based on the comparison result, configuration of data storage or retrieval to/from a remote data storage system may be made so as to ensure the service requirement is met.

To aid further understanding and appreciation of the proposed concept(s), an exemplary implementations will now be described. Such implementations are simply provided to demonstrate process steps and algorithms that may be employed, and it should be understood that other implementations are not limited to such process steps and algorithms only. Indeed, the skilled person will appreciate the other process steps and/algorithms may be employed to undertake and/or provide similar aspects of the proposed concept(s).

Figure 3:
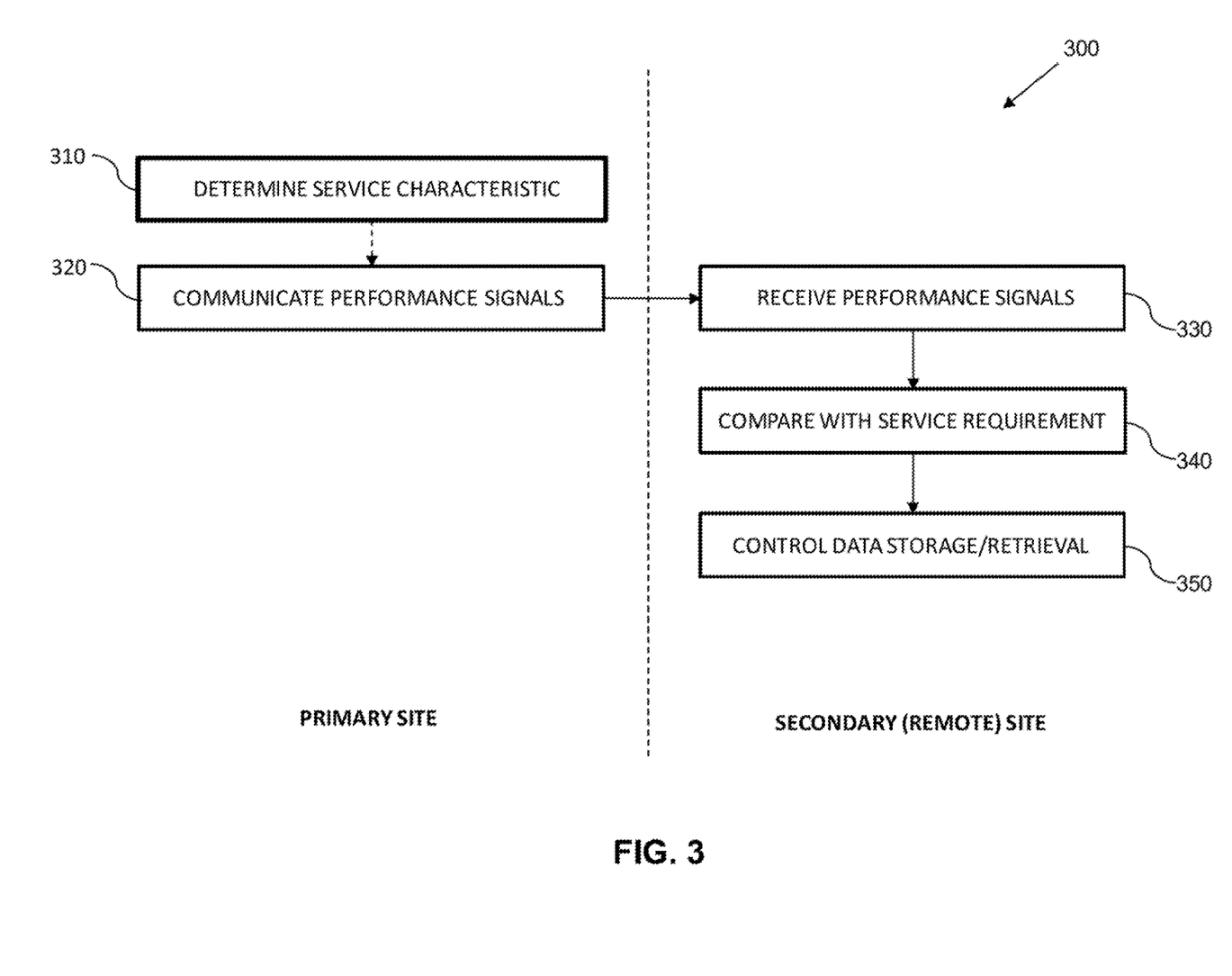
FIG. 3 is a simplified flow diagram of an exemplary embodiment of a computer-implemented method for remote storage of data.

Referring to FIG. 3, an exemplary embodiment of a computer-implemented method 300 for remote storage of data will be described. In this example, a primary site is configured with a backup on a data storage system of a secondary site (remotely located from the primary site). The primary site is provided with a primary storage controller and the secondary site has a secondary storage controller. The secondary storage controller is configured to control data storage and/or retrieval to/from the data storage system of the secondary site. Also, in this example, it is noted that the data storage system of the secondary site is configured to implement a thin-provisioned file system having a plurality of storage tiers.

Step 310 of the method comprises determining, at the primary storage controller, a service characteristic of data storage or retrieval to/from the remote data storage system. Here, determining a service characteristic comprises determining at least one of: a latency of a communication link between the primary storage controller and the secondary storage controller; a data write latency of the remote data storage system; a status of a recovery point objective; an available data storage space of the remote data storage system; and an available buffer space of the remote data storage system. Of course, it will be understood that other service characteristics may be determined in order to establish a description of at least one aspect of data storage/retrieval performance.

Based on the determined service characteristic(s), service performance signals are generated and communicated from the primary storage controller to the secondary storage controller of the remote data storage system in step 320. The service performance signals comprise information describing the determined service characteristic(s). Accordingly, the service performance signals are used to convey information describing determined service characteristic(s) to the secondary storage controller.

Step 330 comprises receiving service performance signals at the secondary storage controller. In this way, the information describing determined service characteristic(s) is obtained by the secondary storage controller.

Step 340 comprises comparing, at the secondary storage controller, the received service performance signals with a service requirement so as to determine a service comparison result. In this exemplary embodiment, the service requirement comprises at least one of: a maximum latency; a minimum available buffer space; a minimum available data storage space; and a maximum recovery point objective. Accordingly, it will be understood the step 340 entails assessing or analyzing the determined service characteristic(s) with reference to one or more service requirements (e.g., to identify if system performance is meeting the one or more service requirements).

Based on the service comparison result, data storage or retrieval to/from the remote data storage system is controlled at the secondary storage controller in step 350. By way of example, the step 350 of controlling data storage or retrieval to/from the remote data storage system in this examples comprises determining a target storage tier based on the service comparison result. In other examples, however, the controlling data storage or retrieval to/from the remote data storage system may comprise alternative or additional process, such as determining a garbage collection workload based on the based on the service comparison result for example.

In the above example in FIG. 3, the service requirement has already been established prior to implementing the method (e.g., via a previously undertaken process). However, it is to be understood that alternative embodiments may include determining the service requirement. For example, such a process of determining the service requirement may be based on an input signal from a user or a control system.

Embodiments are directed to ensuring that remote partnerships remain consistent and are not subject to slandering due to target storage controller latencies for example. Proposals may implement and monitor service agreements between the primary and secondary storage controllers. Based on how monitored system performance compares against the service agreements, data storage and/or retrieval can be controlled (e.g., by selecting optimal garbage collection workloads and/or storage tier destinations for copy-targets).

By way of further description, an exemplary implementation may feature a Disaster Recovery (DR) block storage controller with one or more production sizes providing data for the primary site (e.g., production site). The DR system may have storage associated with various different tiers (e.g., SSDs, HDDs, etc.) and may implement its block storage using a garbage collecting thin-provisioned system, featuring compression and deduplication optionally.

In situations where it is determined that the monitored service characteristic is indicative that remote copy partnerships are in danger of exhausting resources the space allocator on the DR site may preferentially allocate higher performing storage for incoming writes to that volume. Also, assuming this behavior to be a burst, other optimizations can be made on the DR system, such as temporarily relaxing garbage collection on the pool to allow for more system bandwidth, at the cost of having a lower reclamation rate.

Figure 4:
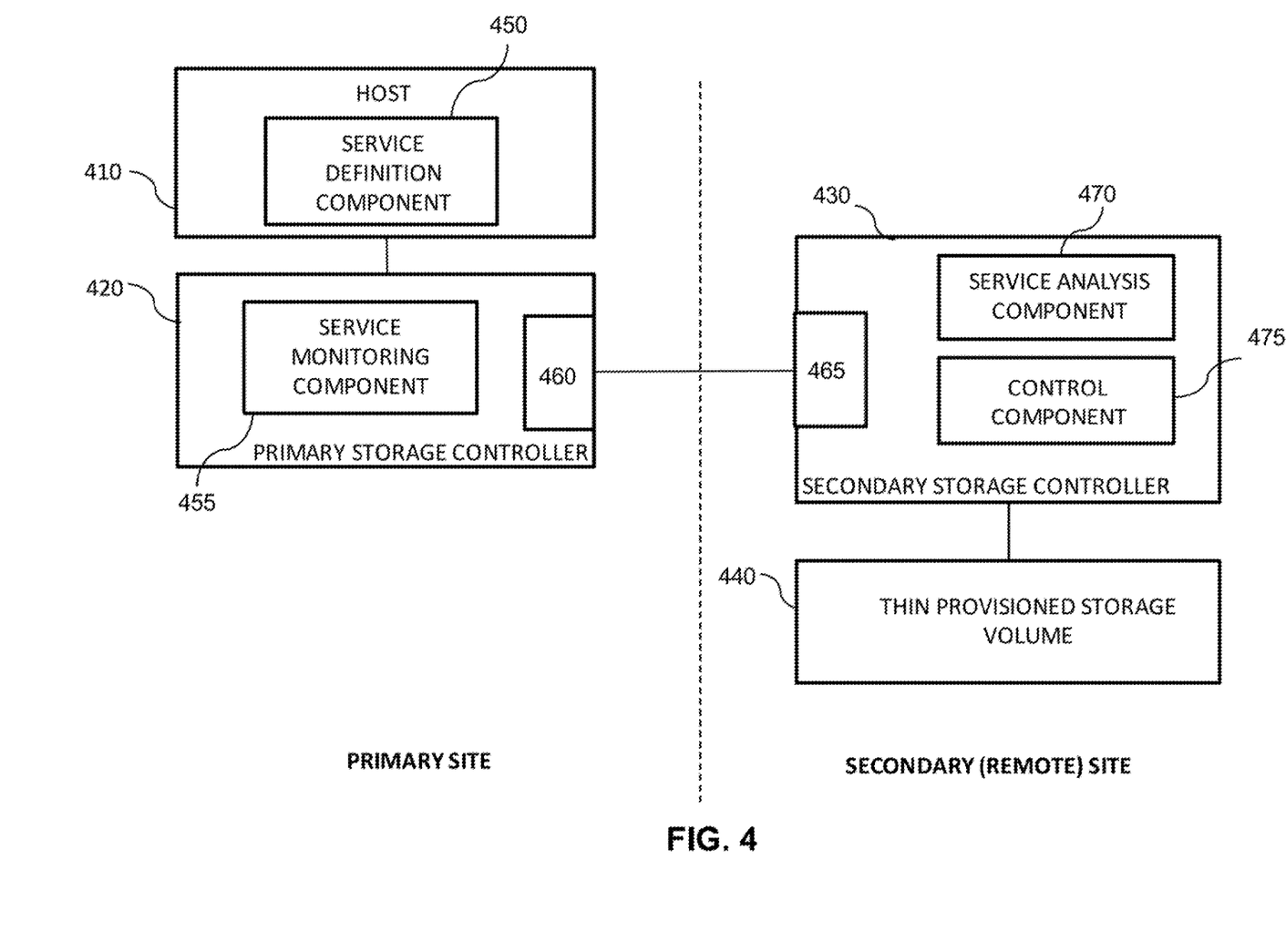
FIG. 4 is a block diagram of a system for remote storage of data according to an embodiment.

Referring now to FIG. 4, there is depicted yet another embodiment. More specifically, FIG. 4 is a simplified block diagram of a system for remote storage of data according to an exemplary embodiment. The system comprises a host 410 and a primary storage controller 420 at a primary site. The system also comprises a secondary storage controller 430 of a thin provisioned storage volume 440 at a secondary (remote) site.

The host 410 comprises a service definition component 450 configured to determine the service requirement based on an input signal from a user. By way of example, the service requirement comprises at least one of: a maximum latency; a minimum available buffer space; a minimum available data storage space; and a maximum recovery point objective. Although an input signal from a user may be used in this example, other embodiments may be configured to determine the service requirement based on signal from a control system.

The primary storage controller 420 comprises a service monitoring component 455 that is configured to determine a service characteristic of data storage or retrieval to/from the storage volume 440 at a secondary (remote) site. In this example, the service monitoring component 455 is configured to determine a measure of the service characteristic(s) used for the service requirement. Thus, in this example, the service monitoring component 455 is configured to determine at least one of: a latency of a communication link between the primary storage controller and the secondary storage controller; a data write latency of the remote data storage system; a status of a recovery point objective; an available data storage space of the remote data storage system; and an available buffer space of the remote data storage system.

The primary storage controller 420 also comprises a communication interface 460 that is configured to communicate service performance signals to the secondary storage controller 430 based on the determined service characteristic(s).

The secondary storage controller 430 comprises an input interface 465 that is configured to receive said service performance signals from the primary storage controller 420. A service analysis component 470 of the secondary storage controller 430 is configured to compare the received service performance signals with the service requirement so as to determine a service comparison result. Based on the service comparison result, a control component 475 of the secondary storage controller 430 is configured to control data storage or retrieval to/from the storage volume 440. In this example, because the storage volume 440 is configured to implement a plurality of storage tiers, the control component 475 of the secondary storage controller 430 is configured to determine a target storage tier based on the service comparison result.

Under proposed approaches, service agreements (e.g., defining one or more service requirements) may be agreed (e.g., by the service definition component 450) between the production (i.e., primary) sites and DR (i.e., secondary) site. The secondary site may then attempt to adhere to these service agreements by adapting control of data storage and/or retrieval in response to determined service characteristics.

A first class of the agreements can be based on the global system resources of a given production site (e.g., are there adequate resources to continue operating and avoid having an error event). A second class of these agreement may be per-volume-oriented statistics, noting details such as the oldest IO that has not been processed by the partner system, and a user-defined target of the maximum this may be.

For a given volume, the DR site may have multiple service agreements which it must attempt to maintain. In practice, this may mean that the secondary storage controller assign storage based on the most in-danger service agreement for example. For instance, for a given IO, the secondary storage controller may allocate based on a consideration of an overall pressure on the system (e.g., determining if there are other IOs which need storage) versus the current IO's associated service agreements. Then, based on system resources and the assessment result(s), storage may be allocated for a performance bracket.

The production site (i.e., primary storage controller) may transmit details to aid the DR site in being able to determine if a service agreement is in danger of being violated. Such information about one or more service characteristics may extend to link telemetry (e.g., to determine if the link is over-subscribed), and thus identify if the DR storage is not the source of significant overhead.

Embodiments may determine if the remote storage system requires higher performance for a given volume. By way of example, this may be determined based on link telemetry data indicating that the remote storage system, not the link, is the source of system latency. In such an example, if it is determined that the service agreements are in danger of being breached, the secondary storage controller may allocate writes for a given volume on faster storage. If the converse is true (i.e., that the underlying volume's service agreement is not at risk of being violated), the secondary storage controller may deprioritize this IO, assigning this to cheaper, slower storage. Also, if the system is globally not in danger of violating any service agreement, the system can be configured to perform extended amounts of garbage collection for example.

From the above description, it will be understood that proposed embodiments may provide a DR system which is significantly more capable of maintaining required performance and less vulnerable to being slandered without requiring excessive amounts of high performing storage. The DR site may be able to dynamically respond to workload changes more easily when compared to a conventionally implemented, fully allocated backend, or a naïve thin-provisioned backend.

Embodiments may also help to ensure that remote copy partnerships are more durable, resulting in less risk to user data in the event of a system failure.

Proposed embodiments may provide for the dynamic optimization of the performance characteristics via the secondary storage based on a comparison between a service characteristic and a service requirement. Such optimization may be provided via the selection of storage tier and garbage collection behavior.

Proposed concepts thus provide a system for remote storage of data that facilitates the control of data storage or retrieval to/from a remote data storage system based on a comparison of a service characteristic against a service requirement.

Figure 5:
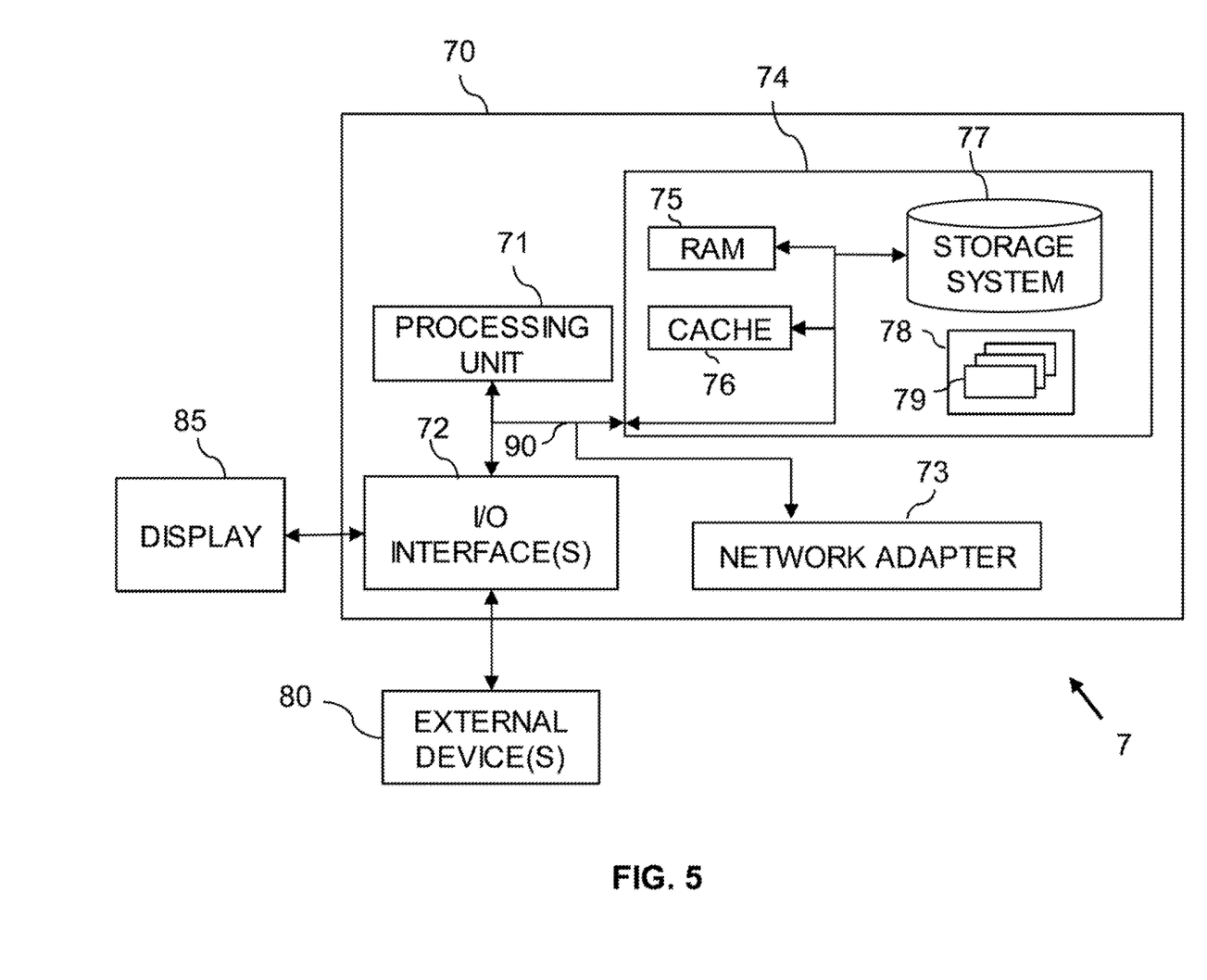
FIG. 5 illustrates a system according to another embodiment.

Embodiments may comprise a computer system 70, which may form part of a networked system 7 illustrated in FIG. 5. For instance, a primary storage controller may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for remote storage of data according to a proposed embodiment.

Program/utility 78, having a set (at least one) of program modules 79, may be stored in memory 74. Program modules 79 generally carry out the functions and/or methodologies of proposed embodiments for remote storage of data.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g., to communicate service performance signals to the secondary storage controller).

In the context of the present application, where embodiments of the present invention constitute a method, it should be understood that such a method is a process for execution by a computer, i.e., is a computer-implementable method. The steps of the method therefore reflect various parts of a computer program, e.g., parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for remote storage of data, the system comprising:
   a primary storage controller, wherein the primary storage controller retrieves a set of service level agreements (SLAs);
   a secondary storage controller of a remote data storage system,
   wherein the primary storage controller comprises:
   a service monitoring component configured to determine a service characteristic of data storage or data retrieval associated with the remote data storage system; and
   a communication interface configured to communicate service performance signals to the secondary storage controller based on the determined service characteristic,
   and wherein the secondary storage controller comprises:
   an input interface adapted to receive service performance signals from the primary storage controller;
   a service analysis component configured to compare the received service performance signals with a service requirement so as to determine a service comparison result; and
   a control component adapted to control data storage to or data retrieval from the remote data storage system based on the service comparison result, wherein the control component of the secondary storage controller is configured to determine a target storage tier out a plurality of storage tiers for remote copy based on the service comparison result; and
   based on a performance requirement of the remote data storage system:
   allocating writes for a given volume on a first type of storage using the secondary storage controller based on a first type of detected speed associated with the first type of storage in response to a determination that the SLAs are in danger of breach; and deprioritizing and assigning the writes for the given volume on a second type of storage using the secondary storage controller based on a second type of detected speed associated with the second type of storage in response to a determination that the SLAs are not in danger of breach.

2. The system of claim 1, wherein the service requirement is selected from the group consisting of:
a maximum latency;
a minimum available buffer space;
a minimum available data storage space; and
a maximum recovery point objective.

3. The system of claim 1, wherein the service monitoring component is further configured to determine at least one of:
a latency of a communication link between the primary storage controller and the secondary storage controller;
a data write latency of the remote data storage system;
an available data storage space of the remote data storage system; and
an available buffer space of the remote data storage system.

4. The system of claim 1, further comprising:
a service definition component configured to determine the service requirement.

5. The system of claim 4, wherein the service definition component is configured to determine the service requirement based on an input signal from a user or a control system.

6. The system of claim 1, wherein the secondary storage controller is configured to control data storage to or data retrieval from a thin-provisioned file system of the remote data storage system.

7. The system of claim 1, further comprising:
a second primary storage controller comprising: a second service monitoring component configured to determine a second service characteristic of data storage to or data retrieval from the remote data storage system; and a second communication interface configured to communicate second service performance signals to the secondary storage controller based on the determined second service characteristic,
wherein the input interface of the secondary storage controller is further configured to receive the second service performance signals from the second primary storage controller,
wherein the service analysis component of the secondary storage controller is further configured to compare the second service performance signals with the service requirement so as to determine a second service comparison result,
and wherein the control component of the secondary storage controller is configured to control data storage to or data retrieval from the remote data storage system further based on the second service comparison result.

8. A computer-implemented method for remote storage of data, the method comprising:
determining, at a primary storage controller, a service characteristic of data storage or data retrieval associated with a remote data storage system, wherein determining the service characteristic includes determining a status of a recovery point objective;
communicating service performance signals from the primary storage controller to a secondary storage controller of the remote data storage system based on the determined service characteristic;
receiving service performance signals at the secondary storage controller;
comparing, at the secondary storage controller, the received service performance signals with a service requirement so as to determine a service comparison result; and
controlling, at the secondary storage controller, data storage to or data retrieval from the remote data storage system based on the service comparison result, wherein controlling data storage to or data retrieval from the remote data storage system comprises determining a target storage tier out a plurality of storage tiers for remote copy based on the service comparison result; and
based on a performance requirement of the remote data storage system:
allocating writes for a given volume on a first type of storage using the secondary storage controller based on a first type of detected speed associated with the first type of storage in response to a determination that the SLAs are in danger of breach; and
deprioritizing and assigning the writes for the given volume on a second type of storage using the secondary storage controller based on a second type of detected speed associated with the second type of storage in response to a determination that the SLAs are not in danger of breach.

9. The method of claim 8, wherein the service requirement is selected from the group consisting of:
a maximum latency;
a minimum available buffer space;
a minimum available data storage space; and
a maximum recovery point objective.

10. The method of claim 8, wherein determining the service characteristic further comprises determining at least one of:
a latency of a communication link between the primary storage controller and the secondary storage controller;
a data write latency of the remote data storage system;
an available data storage space of the remote data storage system; and
an available buffer space of the remote data storage system.

11. The method of claim 8, further comprising:
determining, at a service definition component, the service requirement.

12. The method of claim 11, wherein determining the service requirement is based on an input signal from a user or a control system.

13. The method of claim 8, wherein the secondary storage controller is configured to control data storage to or data retrieval from a thin-provisioned file system of the remote data storage system.

14. The method of claim 8, further comprising:
determine, at a second primary storage controller, a second service characteristic of data storage to or data retrieval from the remote data storage system;
communicate second service performance signals from the second primary storage controller to the secondary storage controller based on the determined second service characteristic;
receiving second service performance signals at the secondary storage controller; and
comparing, at the secondary storage controller, the second service performance signals with the service requirement so as to determine a second service comparison result, and wherein controlling data storage to or data retrieval from the remote data storage system is further based on the second service comparison result.

15. A computer program product comprising a computer readable storage medium having program instructions embodied therewith, the program instructions executable by a processing unit to cause the processing unit to perform, when run on a computer network, a method for remote storage of data comprising the steps of:

determining, at a primary storage controller, a service characteristic of data storage or data retrieval associated with a remote data storage system, wherein determining the service characteristic includes determining a status of a recovery point objective;

communicating service performance signals from the primary storage controller to a secondary storage controller of the remote data storage system based on the determined service characteristic;

receiving service performance signals at the secondary storage controller;

comparing, at the secondary storage controller, the received service performance signals with a service requirement so as to determine a service comparison result; and controlling, at the secondary storage controller, data storage to or data retrieval from the remote data storage system based on the service comparison result, wherein controlling data storage to or data retrieval from the remote data storage system comprises determining a target storage tier out a plurality of storage tiers for remote copy based on the service comparison result; and based on a performance requirement of the remote data storage system:

allocating writes for a given volume on a first type of storage using the secondary storage controller based on a first type of detected speed associated with the first type of storage in response to a determination that the SLAs are in danger of breach; and deprioritizing and assigning the writes for the given volume on a second type of storage using the secondary storage controller based on a second type of detected speed associated with the second type of storage in response to a determination that the SLAs are not in danger of breach.

16. The computer program product of claim 15, wherein the at least one processor is adapted to execute the computer program code of said computer program product.

* * * * *